United States Patent [19]
Reitberger

[11] Patent Number: 5,257,405
[45] Date of Patent: Oct. 26, 1993

[54] METHOD AND SYSTEM FOR SETTING UP LOS-RADIO COMMUNICATION BETWEEN MOBILE OR STATIONARY REMOTE STATIONS

[75] Inventor: Peter Reitberger, Munich, Fed. Rep. of Germany

[73] Assignee: Rohde & Schwarz GmbH & Co. KG, Fed. Rep. of Germany

[21] Appl. No.: 706,256

[22] Filed: May 28, 1991

[30] Foreign Application Priority Data

May 29, 1990 [DE] Fed. Rep. of Germany ....... 4017234

[51] Int. Cl.$^5$ ................... H04B 1/18; H04B 17/02; H04B 7/005
[52] U.S. Cl. .................. 455/54.1; 455/33.1; 455/52.1; 455/63; 455/67.3; 455/129; 455/289; 343/754
[58] Field of Search ............ 343/754; 342/62, 63, 342/64; 455/33.1, 33.2, 33.3, 33.4, 52.1, 54.1, 54.2, 56.1, 129, 62, 63, 67.1, 67.3, 67.7, 254, 226.1, 226.2, 226.3, 278.1, 280, 283, 289

[56] References Cited

U.S. PATENT DOCUMENTS

| | | | |
|---|---|---|---|
| 4,670,906 | 6/1987 | Thro | 455/56 |
| 4,907,290 | 3/1990 | Crompton | 455/56.1 |
| 5,046,130 | 9/1991 | Hall et al. | 455/54.1 |
| 5,117,503 | 5/1992 | Olson | 455/33.1 |
| 5,134,709 | 7/1992 | Bi et al. | 455/33.1 |

FOREIGN PATENT DOCUMENTS

| | | |
|---|---|---|
| 0367935 | 5/1990 | European Pat. Off. |
| 3012484 | 6/1982 | Fed. Rep. of Germany |
| 3335128 | 4/1985 | Fed. Rep. of Germany |
| 3417233 | 11/1985 | Fed. Rep. of Germany |
| 3441722 | 5/1986 | Fed. Rep. of Germany |
| 3337648 | 2/1987 | Fed. Rep. of Germany |

OTHER PUBLICATIONS

VHF and UHF Propagation Curves for Land Mobile Services, Recommendation 529, Report 567.3 "Methods and Statistics for Estimating Field-Strength Values in the Land Mobile Services Using the Frequency Range 30 MHz to 1 GHz", pp. 298-311.
"Automobile Telephone System", Japanese Patent Abstract, No. 60-158737 dated Aug. 20, 1985.
"Antenna Monitor Device", Japanese Patent Abstract, No. 60-150331 dated Aug. 8, 1985.
CCIR Recommendation 529, 1978; "Methods and Statistics for Estimating Field-Strength Values in the Land Mobile Services Using the Frequency Range 30 MHz to 1 GHz", pp. 298-311.
39th IEEE Vehicular Technology Conference No. 89, May 1989, "Propagation Considerations of Low Power Cellular Boosters and Case Histories", by Ronald J. Jakubowski, pp. 523-527.
The ARRL Antenna Book, 1988, pp. 23-4-23-11.

*Primary Examiner*—Reinhard J. Eisenzopf
*Assistant Examiner*—Lisa Charouel

[57] ABSTRACT

For setting up LOS radio links between mobile calling transmitting/receiving stations and other mobile or stationary remote transmitting/receiving stations in a predetermined operating area, especially in the frequency range above 1 GHz, every mobile station is provided with an electronic memory with an associated processor. The memory stores the respective geographical and topographical data of the operating area. Prior to the setting-up of a radio link, the transmission loss between the stations is calculated in accordance with known model calculations on the basis of the geographical and topographical data stored in the memory by inputting into the processor the current location data of the calling station and the remote station.

1 Claim, 5 Drawing Sheets

METHOD AND SYSTEM FOR SETTING UP LOS-RADIO COMMUNICATION BETWEEN MOBILE OR STATIONARY REMOTE STATIONS

BACKGROUND OF THE INVENTION

1. Field of the Invention

The present invention is directed to a system for setting up so-called LOS (line of sight) radio links between mobile transmitting/receiving stations and other mobile or stationary transmitting/receiving stations with a predetermined operating area, and preferably in a frequency band above 1 GHz.

2. Description of the Prior Art

In the case of LOS radio links of the kind used partly in the frequency band above 30 MHz and predominantly in the frequency band above 1 GHz, there exist severe limitations for use in mobile transmitting/receiving stations. This is true since, with a change of location of the mobile stations, the respective field strength attenuation or transmission loss between the calling station and another mobile or stationary remote station is unknown.

To prevent overloading of a radiotelephone network, it has been known to continually determine the number of mobile radiotelephones present in a radio cell, while the association of the radiotelephone to neighboring radio cells is also determined in accordance with the geographical and topographical conditions of the respective sub-area (DE 3,441,722). In this connection, it has also been known to monitor continually the transmission performance of the radio link and to take it into account for control of a dynamic cell size.

For mobile radio links, it has also been known to determine the radio zone boundary between two neighboring radio zones by measuring the relative distance between a mobile subscriber and fixed stations (radio concentrators) (DE 3,335,128). Also, a radio system has been known in which the intercommunicating radio stations adjust the transmitter power of the respective other station in response to the transmission performance (DE 3,417,233). For a radio network comprising a plurality of mobile stations it has also been known to have each station act as a relay between mobile stations communicating in pairs (DE 3,337,648). Finally, it has been known with mobile radio links to perform field strength measurements so as to obtain a criterion for switching a mobile subscriber from one radio area to the next (DE 3,012,484).

These known techniques are unsuitable for setting up optimum LOS radio links and for solving the problems arising in this connection.

SUMMARY OF THE INVENTION

It is therefore an object of the invention to provide a simple system which allows the setting-up of optimum LOS radio links also by mobile transmitting/receiving stations in a frequency range above 1 GHz.

According to the method and system of the invention, an LOS radio link is set up between a mobile calling transmitting/receiving station and another mobile or stationary remote transmitting/receiving station in a predetermined operating area. Each mobile station is provided with an electronic memory and an associated processor. Respective geographical and/or topographical data of the operating area of the mobile station is stored in the memory. Prior to establishing a radio link, a transmission loss is calculated between the calling station and the remote station on the basis of the geographical and/or topographical data stored in the memory by inputting into the processor current location data of the calling station and possibly also the remote station, if not previously entered into the memory.

DESCRIPTION OF THE PREFERRED EMBODIMENTS

Figure 1:
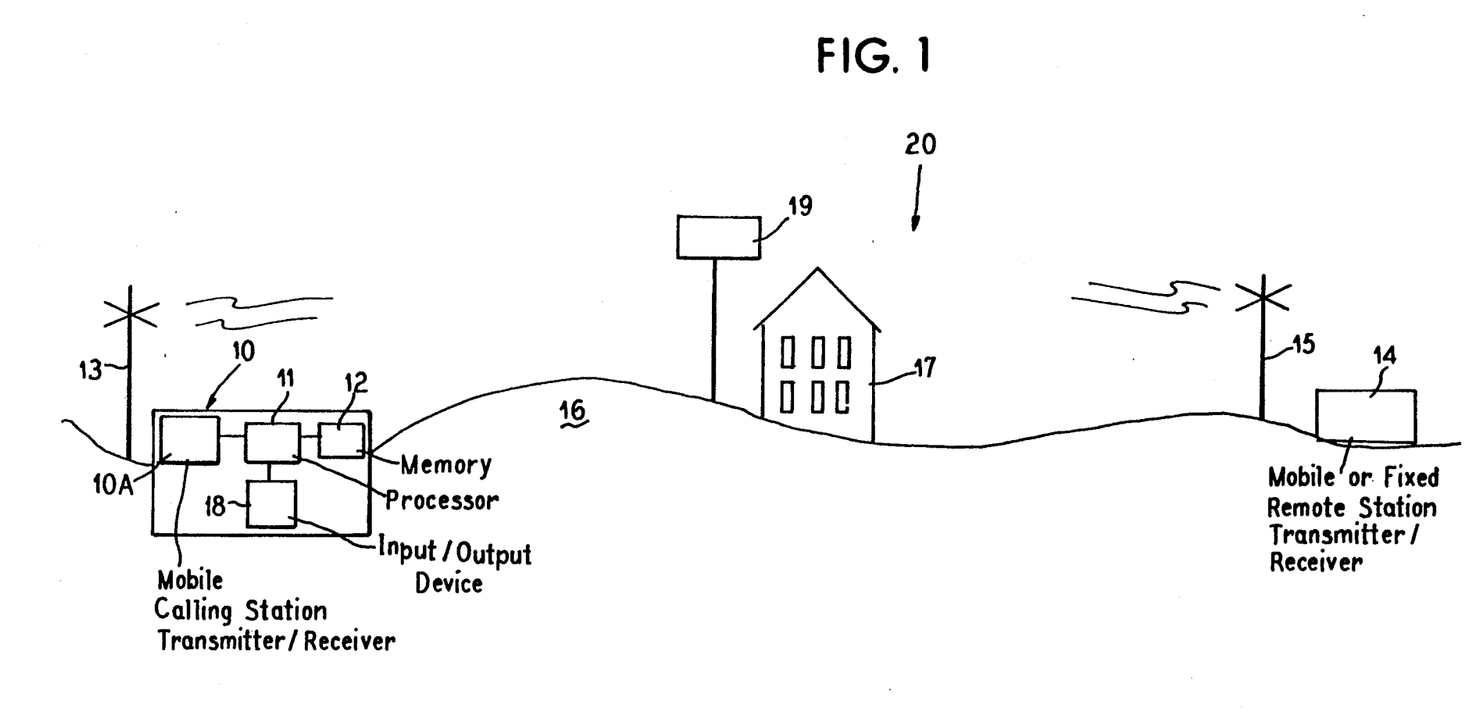
FIG. 1 shows a mobile calling station and a mobile or fixed remote station and wherein a processor and memory containing topographical and/or geographical data is stored according to the system and method of the invention.

With the system according to the present invention as shown in the drawing figure, the respective transmission loss to the remote station 14 with antenna 15 is calculated in every single mobile transmitting/receiving station 10 for the current location on the basis of the geographical and topographical data 16, 17 of the operating area 20 stored in said station 10. The optimum radio availability may then be set directly by correspondingly changing the transmitting and/or receiving parameters of the mobile calling station 10 based on the results of a calculation. This may be done, for example, by a corresponding change of antenna 13 height or a change of the directional pattern of the antenna 13, or a corresponding change of the transmitter power or the receiver sensitivity of the transmitter/receiver 10A, or even by a change of frequency, with due consideration of the frequency response of the receiver. Of course, such a change of the transmitter and/or receiver 10 parameters may also be performed automatically in dependence upon the calculated transmission loss by corresponding control means in the mobile calling station 10. Another possibility of improving the radio availability resides in changing the location of the mobile station until the desired optimum transmitting-/receiving conditions are achieved. To achieve this, it has been found to be advantageous when the radio availability of neighboring locations of the calling station is calculated and indicated at the same time so that the user of the mobile station may immediately take up the best possible location.

"Geographical data of the operating area" are data of the kind indicated in maps, for example absolute altitude above sea level. "Topographical data" refer to the terrain configuration of the operating area 20, to terrain elevations, valleys etc. (surface structure), while "morphological data" are details of buildings 17, of forested terrain, or upgrowth of the operating area 20. All of these data exist already for various countries and areas, and are stored in digital form in data memories so that they can easily be utilized for the purposes of the present invention. Also, they may be continually supplemented during operation in a simple way, for example by having the mobile calling station continually shoot-such as by means of video cameras, radar devices or the like-the topography and morphology of the operating area during the station's movement through the area, and perform a comparison with and possibly updating of the already stored data, for example when a high building has in the meantime been erected in the operating area. Such changes of, or supplements to, the topography and morphology as determined by continuous observation are then directly written into the electronic memory 2 via input/output device 18 and processor 11, and may be taken into account when the radio link is established.

The calculation of the field strength attenuation, i.e. the radio availability between a transmitting and a receiving station with due consideration of the geographical and topographical data of an operating area, is known per se for the planning of large-area radio links (CCIR Report 567-3). Based on an empirical formula (formula derived by Okumura) the basic transmission loss can be calculated as dependent upon frequency, distance, mobile station effective antenna height and remote station antenna height (calculation with reference to geographical data). Moreover, in accordance with these known calculation models, the transmission loss calculated with reference to geographical data may be corrected by factors related to the density of buildings and of vegetation in the vicinity of the station (consideration of topographical and morphological data). This known model calculation is performed directly in every mobile station by use of data stored in the memory 12 which is controlled and processed by use of the input/output device 18 such as a keyboard and the processor 11, with due consideration of all stored geographical, topographical, and morphological data of the operating area for the respective current location of the calling station and the remote station. Thus, the field strength attenuation between the calling station and the remote station is directly determined and may then be taken into account or changed correspondingly when the radio link is actually set up.

As mentioned previously, the calculation of the field strength attenuation is known from CCIR report 567-3, and the Okamura formula. Hereafter, that report is now set forth.

1. Introduction

Propagation in the land mobile services at frequencies in the 30 MHz to 1 GHz range is affected in varying degrees by topography, vegetation, man-made structures, ground constants, the troposphere and the ionosphere.

Curves are provided hereafter for predicting field strength under average conditions for three frequency ranges. Analytical expressions are also provided which are valid for certain frequency ranges and conditions, and various correction factors which can be used to refine the average predictions. Experimental results submitted by individual administrations are described hereafter.

The material herein is statistical in nature and oriented towards application to planning and system design.

2. Propagation Curves

Figure 2:
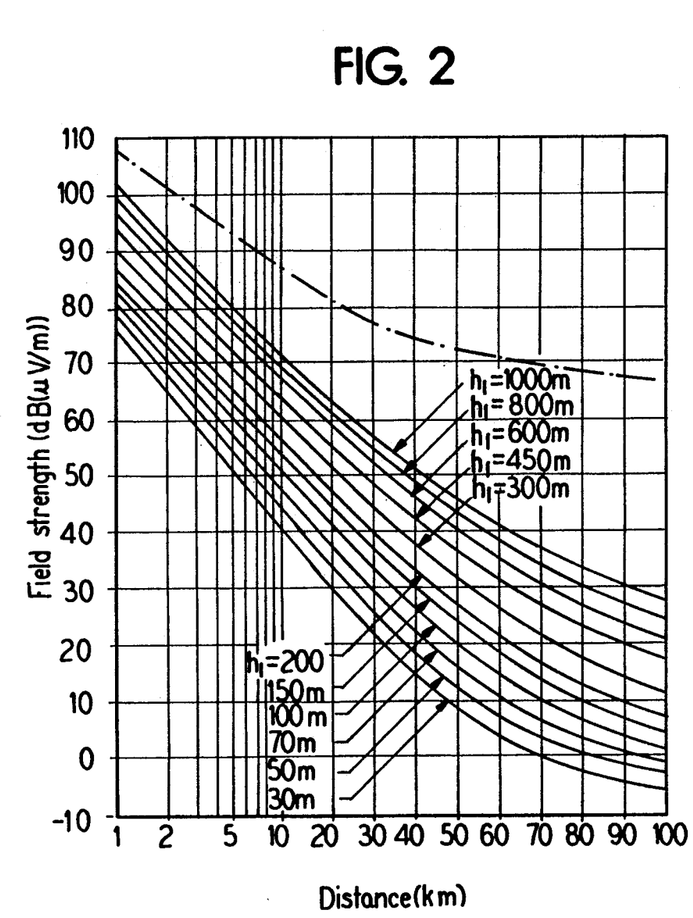
FIGS. 2–6 are graphs showing field strengths versus distance.
Figure 3:
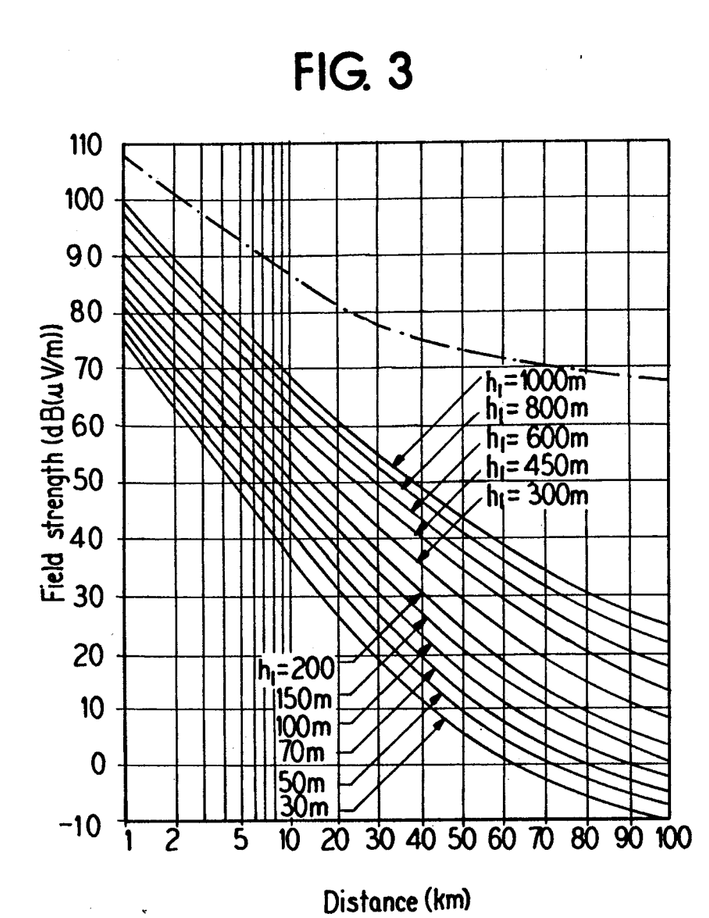

FIGS. 2 and 3 show curves for 450 MHz and 900 MHz at mobile antenna heights of 1.5 m, base station heights between 30 and 1000 m, 50% of the locations and 50% of the time. These particular curves were derived from measurements made in urban areas of Japan (Okumura et al), and should be compared with data from other areas where available.

Measurements made in Japan have shown that the height gain factor from 1.5 to 3 m is 3 dB in urban areas for the UHF band. This value can be used to estimate the median field strength for mobile antenna heights of 3 m using the data for Bands IV and V (Band IV:470-582 MHz; Band V:582-960 MHz) for urban areas as given in FIGS. 2 and 3.

Based on the work of Okumura et al, Table 1 provides an empirical formula for calculating basic transmission loss for distances up to 20 km relating to FIGS. 2 and 3.

TABLE I

| Empirical formula for basic transmission loss |
| --- |
| $L_b = 69.55 + 26.16 \log f - 13.82 \log h_1 - a(h_2) + (44.9 - 6.55 \log h_1) \log R$ dB |
| correction factor for $h_2$: |
| $a(h_2) = (1.1 \log f - 0.7)h_2 - (1.56 \log f - 0.8)$ |
| Where: |

| | | |
| --- | --- | --- |
| $f$: | frequency | 450–1000 MHz |
| $h_1$: | base station effective antenna height | 30–200 m |
| $h_2$: | vehicular station antenna height | 1–10 m |
| $R$: | distance | 1–20 km |

Theoretical curves for the VHF band were also derived by Okumura et al for the urban environment. The empirical formula given in Table 1 may be applicable for frequencies in the range 150–1 500 MHz, and field-strength measurements at a frequency of 160 MHz, made in an urban area of Madrid, Spain, were found to be in good agreement with this model. Further data are required to investigate the validity of the model in terms of frequency range and receiving antenna height.

Figure 8:
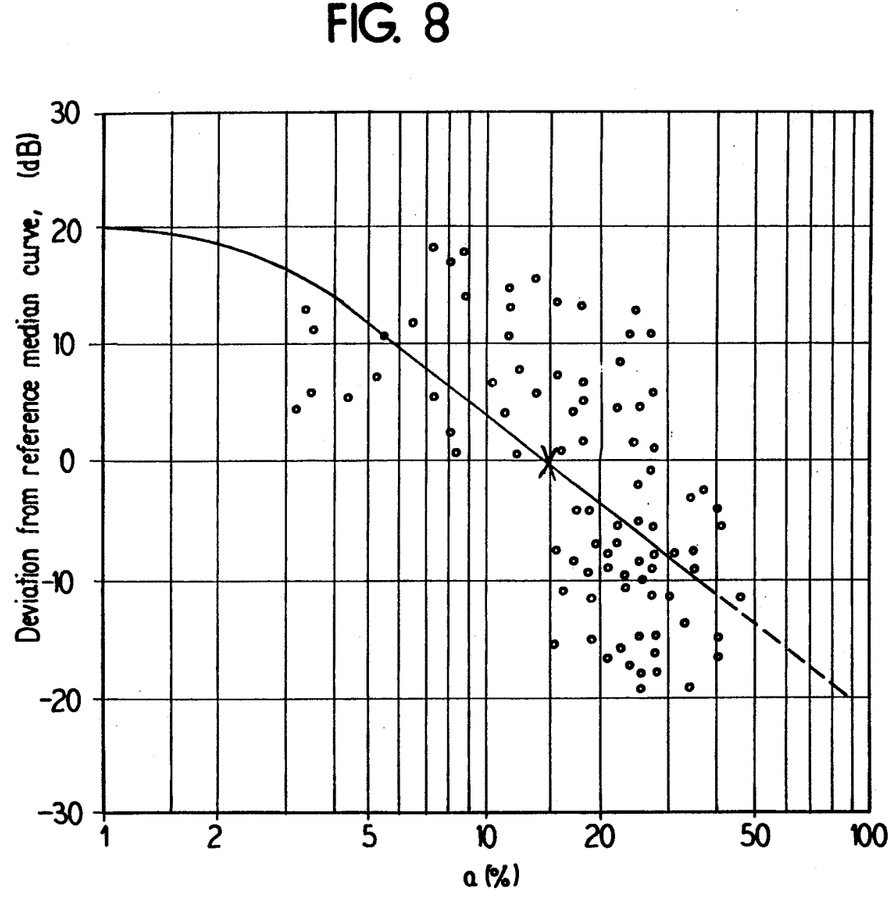
FIG. 8 is a graph showing deviation from median field strength curve due to buildings surrounding mobile station.

FIG. 8 provides a correction factor for use with FIG. 1 where the density of buildings in the vicinity of the mobile station is greater or less than the reference density for which the curves were derived (15% of the area covered by buildings).

Figure 4:
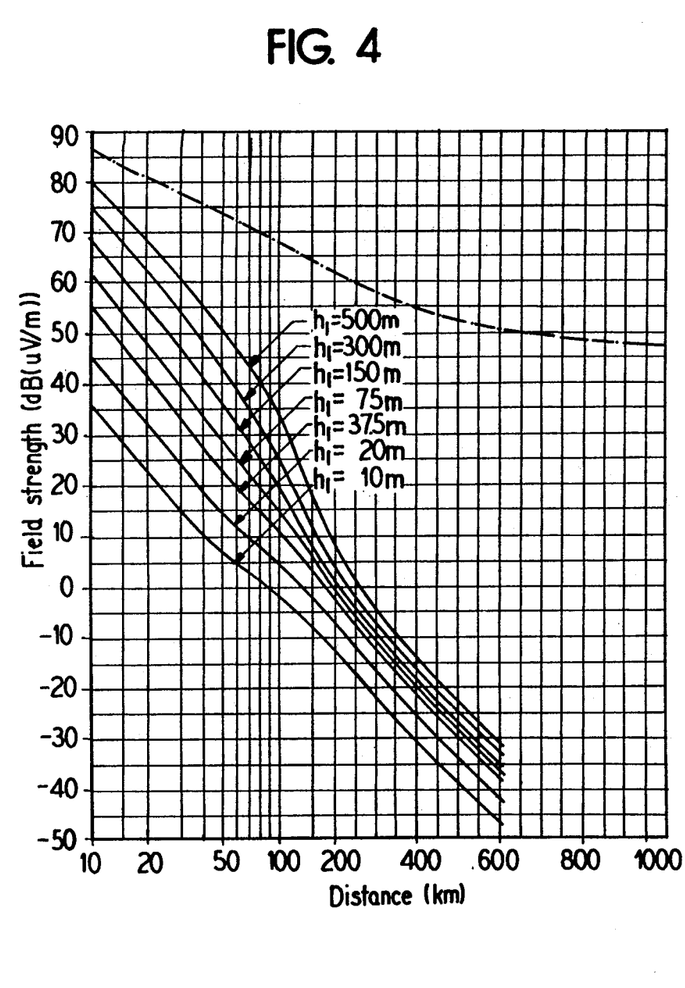
Figure 5:
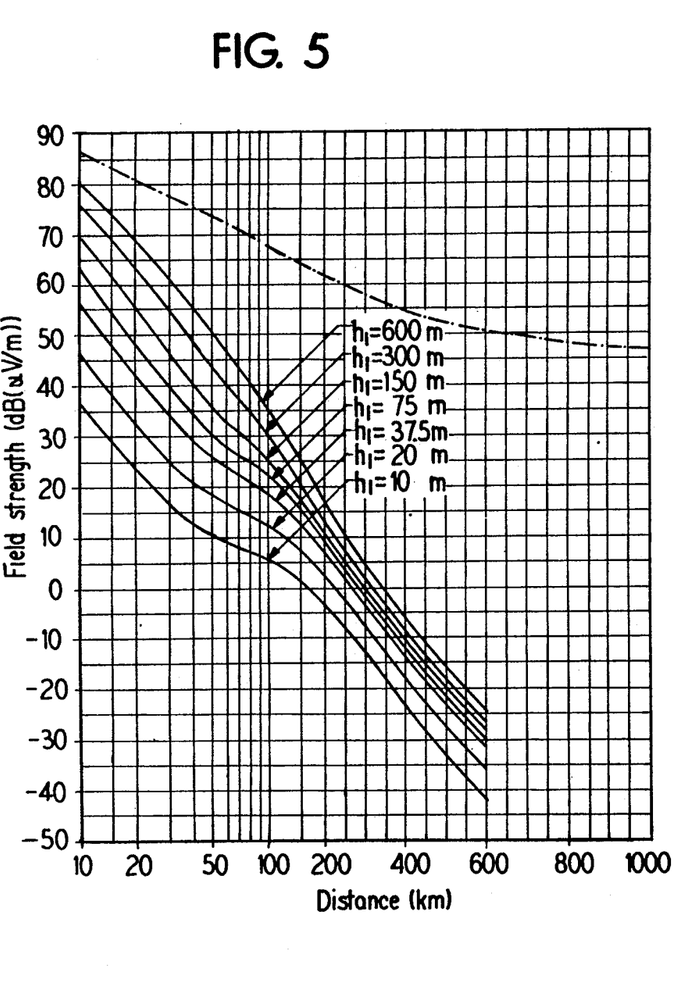
Figure 6:
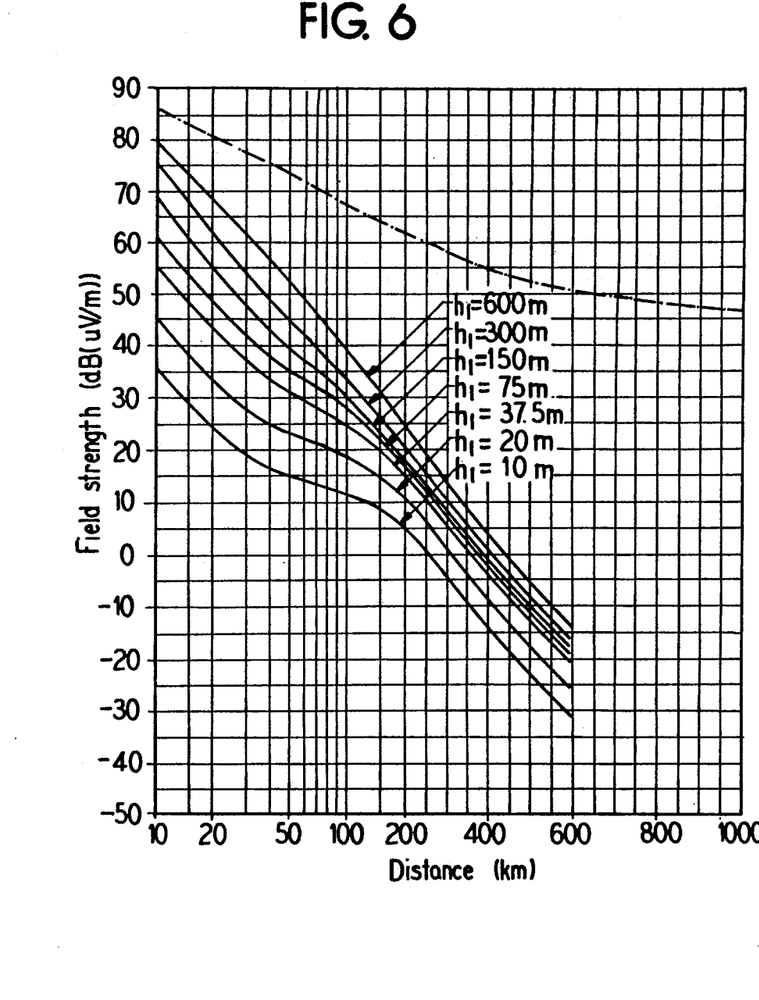

FIGS. 4, 5, and 6 show propagation curves which are valid for frequencies approximately between 100 and 250 MHz, mobile antenna heights of 3 m, base antenna heights between 10 m and 600 m, for rural conditions, for 50% of the locations, and for 50%, 10% and 1% of the time.

The curves in FIGS. 4, 5, and 6 were derived from corresponding curves in CCIR with appropriate corrections for a mobile station antenna height of 3 m. A correction of 8 dB was applied for distances up to 50 km and 4 dB for distances greater that 100 km with linear interpolation for intermediate distances.

The mobile station height correction factors used here for rural areas were based on work described in various publications and work done in the United Kingdom. However, more recent work in the United Kingdom, the USSR, the Federal Republic of Germany, Switzerland and the United States of America suggests that height gain factors may not be distance dependent but may be dependent on terrain irregularity and objects in the vicinity of the mobile station.

The curves in FIGS. 4, 5, and 6 for base station antenna heights of 20 and 10 m were derived from the 37.5 m curves by applying distance dependent correction factors which were based on a theoretical study by the Federal Republic of Germany.

Generally, the effective antenna height of the base station intended to be used with FIGS. 2 to 6 herein and with the formulae in Table 1 is defined as the height of the antenna over the average level of the ground between distances of 3 and 15 km from the base station in the direction of the mobile station.

Under some conditions, particularly for short distances of only a few kilometers or if the mobile station is situated higher than the base station, the definition for base station antenna height given above may lead to arithmetic results without physical significance. A study in the Federal Republic of Germany found that the following definition led to better results on the average:

$$h_1 = \begin{cases} h_b + h_{0b} - h_{0m} & \text{for } h_{0b} > h_{0m} \\ h_b & \text{for } h_{0b} \leq h_{0m} \end{cases}$$

where:
$h_1$:base station effective antenna height,
$h_b$:antenna height above ground at the base station,
$h_{0b}$:terrain height above sea level at the base station,
$h_{0m}$:terrain height above sea level-the mobile station.

Field-strength measurements carried out in rural areas in the People's Republic of Poland at frequencies between 34 and 306 MHz have shown good agreement with the propagation curves of Recommendation 370 when allowance is made for terrain effects.

Measurements carried out in the Canadian arctic at frequencies of 148 and 450 MHz at distances up to 100 km suggest that in such regions field strengths may be greater than those predicted by FIG. 4.

Measurements carried out in the People's Republic of Poland over a trans-horizon path on a frequency of 342 MHz have shown that the 1% values of field strength exceed the values estimated on the CCIR curves by 2 to 8 dB and that the 1% and 10% values show marked variations between day and night.

The relationship between the field strength, E'(Db($\mu$V/m), for 1 kW radiated from a halfwave dipole) as found from the curves herein and the basic transmission loss, $L_b$, (i.e., the loss between isotropic antennas) is given by:

$$L_b = 139.4 + 20 \log fMHz - E'dB \quad (1)$$

The transmission loss between halfwave dipoles, $L_d$ is given by:

$$L_d = 135.1 + 20 \log fMHz - E'dB \quad (2)$$

Measurements made in a multipath situation may not reflect the relationships shown in equations (1) and (2) above.

Field strength data taken in several metropolitan areas in the United States at 900 MHz (see §5.2 below) generally show good agreement with the distance trends of the curves for urban areas shown in FIGS. 2 and 3. However, some of the surveys showed significant difference of average field-strength levels from these curves.

Results of comparisons at 450 MHz of measured path losses around London with those predicted from computer-based procedures incorporating terrain height information from a United Kingdom terrain data bank have been previously reported. Separate measurements were conducted along radial, circumferential and mixed-path routes.

3. Calculation of Field-strength Values

For line-of-sight paths for frequencies at VHF and slightly lower the field strengths may be calculated using the method described below which is based on work done in the People's Republic of Poland following work done in the United States. The method is appropriate for unobstructed propagation paths since no account is taken of the effects of the local environment, e.g. buildings.

The use of an effective antenna height based on the electrical characteristics of the ground is especially applicable at the lower frequencies, for lower antenna heights, for vertical polarization, and over wet ground.

A first order estimate of the median field-strength E($\mu$V/m) is given by:

$$E = 88 \, p_i \frac{h_1 h_r}{\lambda d^2} \quad (3)$$

$p_i$:effective radiated power of the transmitter, using a half-wave dipole antenna (W),
d:distance between antennas (km),
$h_1$:effective height of the transmitting antenna (m),
$h_r$: effective height of the receiving antenna (m),
$\lambda$:wavelength (m).

These effective heights are given by:

$$h_1 = \sqrt{h_1^2 + h_0^2} \quad (4)$$

$$h_r = \sqrt{h_2^2 + h_0^2} \quad (5)$$

where:
$h_1$:actual height of the transmitting antenna (m),
$h_2$:actual height of the receiving antenna (m), and
$h_0$:(m) is obtained.

for vertical polarization, (6)

$$h_0 = \frac{\lambda}{2\pi} ((\epsilon_r + 1)^2 + (60\lambda\sigma)^2 \frac{1}{4} \, m$$

for horizontal polarization, (7)

$$h_0 = \frac{\lambda}{2\pi} ((\epsilon_r - 1)^2 + (60\lambda\sigma)^2) - \frac{1}{4} \, m$$

where:
$\lambda$:wavelength (m),
$\epsilon_r$:relative permittivity,
$\sigma$:conductivity of the ground (S/m).

Figure 7:
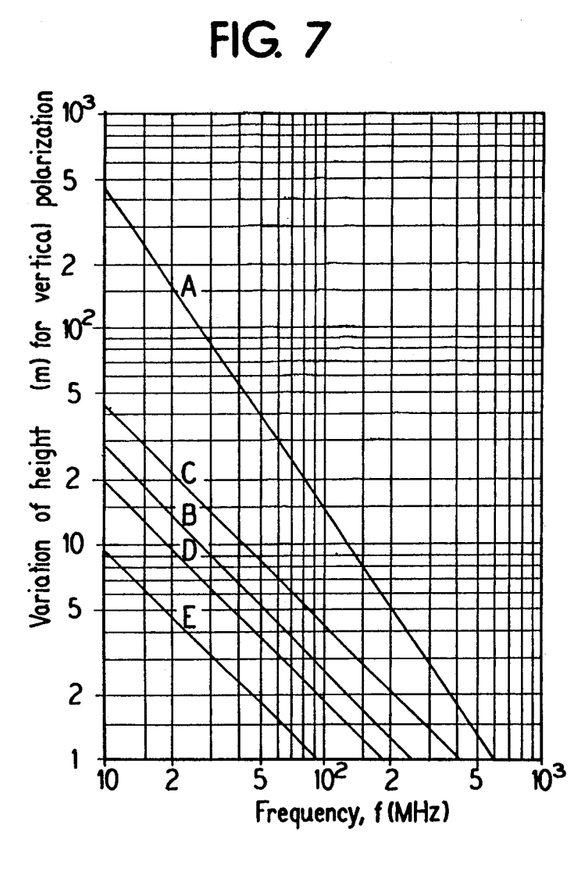
FIG. 7 is a graph showing variation of height with frequency.

For horizontal polarization, at frequencies above approximately 40 MHz, the effective heights of the transmitting and receiving antennas may be assumed to equal the actual heights. To aid calculation when using vertical polarization, FIG. 7 is a graphical representation of equation (6) for various types of terrain.

Equation (3) is valid within the region where the field decreases monotonically with distance up to the radio horizon.

Corrections for terrain topography, vegetation and man-made structures may be added to equation (3), and are discussed in CCIR Recommendation 370 and CCIR Report 239.

At distances beyond the radio horizon at frequencies below 90 MHz and for small percentages of time, the effects of the ionosphere may be important.

4. Depolarization Phenomena

The depolarization factor is defined as the ratio of the amplitude of the orthogonally polarized component, produced by some propagation mechanism, to the amplitude of the original plane polarized wave. For land mobile systems it may be sometimes more convenient to consider the polarization discrimination factor is normally expressed in decibels and is, in practice, of the opposite sign but numerically equal to the depolarization factor provided that the latter is not too small.

Measurements in Sweden of the depolarization effect, with both antennas at a low height (less than 10 m), have shown that the depolarization factor increases with increasing frequency from about −18 dB at 35 MHz to about −7 dB at 950 MHz.

The depolarization factor is log-normally distributed with a standard deviation somewhat dependent on the frequency. The average value of the difference between the 10% and 90% values (in the frequency range 30 to 1000 MHz) is about 15 dB. Whether the original polarization is vertical or horizontal has been observed to make only a slight difference in this respect.

Two types of time variation of the depolarization effect have been found. The first is a slow variation resulting from the changing electrical properties of the ground with weather conditions. This effect is most pronounced at lower frequencies. The second is due to the motion of trees which gives a depolarization fading phenomenon amounting to several decibels in amplitude at quite moderate wind velocities.

5. Attenuation Due to Vegetation and Buildings

Signals transmitted to and from moving vehicles in urban or forested environments exhibit extreme variations in amplitude due to multiple scattering. Fades of 30 dB or more below the mean level are common. A number of investigators have reported that the instantaneous field strength when measured over distances of a few tens of wavelengths is approximately Rayleigh-distributed. The mean values of these small sector distributions vary widely from area to area, depending on height, density and distribution of trees, buildings and other structures. Studies concerning these variations are described below. Some studies concerning signal attenuation through the walls of buildings are also described.

5.1 Attenuation Due to Vegetation

A general discussion of signal attenuation in forested terrain appears in CCIR Report 236 which describes the various paths and mechanisms for propagation through an idealized forest environment and presents models giving attenuation as a function of frequency and length of path through the trees. These models cover situations where both antennas are within the forest and where at least one antenna is within or close to the edge of the trees. In the case where both antennas are well clear of a grove of trees, the path can be treated as a diffraction path.

CCIR Report 239 discusses the case where both transmitter and receiver are located above the forest as in the broadcast and radio-relay systems. For mobile systems where the base station antenna is located outside or above the trees and mobile stations move in and out of wooded areas, a method described by Kinase may be useful. This method determines attenuation from median field-strength curves as a function of frequency and percentage of an area covered by clutter, including both trees and buildings.

Measurements were carried out in Washington D.C. to determine the variation in received signal levels due to changes of season for mobile stations operating in woodland areas. Cumulative statistics for the relative signal levels with trees in full leaf and without leaf were determined for transmission at 459 and 955 MHz. The median seasonal difference for both frequencies was found to be approximately 4.5 dB and the upper decile was approximately 6 dB.

5.2 Attenuation Due to Buildings

According to experimental results in Japan, the median field strength is particularly affected by the buildings around a mobile station, because the mobile station antenna height is almost always lower than these buildings. At 450 MHz these buildings cause a considerable deviation of the median field strength in any small area (of about 0.25 km$^2$) compared with the reference median field strength typical of urban areas, as shown in FIG. 2. This local deviation from the reference value is shown in FIG. 8 as a function of the parameter $\alpha$, where $\alpha$ is defined as the percentage of the area covered by buildings. Each point in the graph is the deviation of the median field strength for one such small area. The values of median field strength in the 800 MHz band were found to be strongly correlated with those in the 400 MHz band. The regression line in FIG. 8 for $\alpha$ less than 5% was determined from data measured at 800 MHz in Japan which included locations with values of $\alpha$ less than 1%.

Measurements in urban areas in the People's Republic of Poland at frequencies between 34 and 306 MHz show that the spread of field-strength values seems to be almost independent of frequency.

Field strength measurements at 900 MHz in several metropolitan areas in the United States show significant differences in average signal level from city to city not accounted for by differences in terrain. Variations in small-area (of the order of 0.25 km$^2$) medians about the average level at a given distance show standard deviations of 3 to 12 dB. An attempt is being made to relate these variations in signal level and standard deviation to the distribution of trees and buildings.

5.3 Building Penetration Loss

The attenuation of radio waves through the walls of buildings is a crucial factor in the feasibility and design of portable radio communications and paging systems. Studies of this attenuation are reported below.

Measurements at 940 MHz were carried out in a medium-size city in the United States (Louisville, Ky.) to determine building penetration losses for hand-held portable radios. These measurements were averaged for 3.7 by 3.7 m areas so as to average the effects of multipath fading. For typical steel and concrete and stone office buildings these averages were found to be normally distributed between 10 and 90% with a mean of 10 dB and a standard deviation of 7.3 dB. These statistics may be used with the field-strength values determined from FIG. 2 to estimate probable field-strength levels on the ground floor of office buildings comparable in nature to those in the test city.

Measurements were carried out on a number of residential suburban houses in the United States to determine building penetration losses. Medians of the envelope variations over small areas (1.2 m by 1.2 m) were used to determine attenuation statistics for the houses. Cumulative distributions for building penetration losses for the ground and first floors were approximately log-normal with median values of 5.8 dB and 0.1 dB, and standard deviations of 8.7 dB and 9.0 dB, respectively.

Measurement of building penetration losses at 850 MHz were carried out on 14 office and industrial buildings in a large city in the United States. Ground floor penetration losses averaged 18.0 dB with a standard deviation of 7.7 dB for buildings in the urban area and 13.1 dB with a standard deviation of 9.5 dB for buildings in the suburban area. The overall decrease of penetration loss with height was about 1.9 dB per floor. For individual buildings the losses on upper floors were influenced by the height of surrounding buildings. The average loss for areas with windows was about 6 dB less than that for areas without windows.

In order to characterize signal statistics for a severe case, attenuation measurements were carried out in a steel sheel building at 900 MHz in the United States. Cumulative statistics of relative signal strengths inside and outside the building for receiver antennas located at heights of 1 to 2 m above the floor were approximately Rayleigh-distributed with a median attenuation of 28.5 dB.

Building penetration loss in the 900 MHz band was measured in several kinds of buildings in Japan. The measured penetration losses from the entrance to the core of the buildings along the corridors ranged from 1 to 2 dB/m.

5.4 Body Effect Loss

In the design of portable telephone and radio paging systems, it is important to quantify the loss due to the presence of a body in the multipath field. The degradation in effective antenna performance due to scattering and absorption by a human body was measured in the 900 MHz band in an urban area. When the dipole antenna was placed at the waist and shoulder of a human, the received field strength decreased by 4-7 dB and 1-2 dB respectively, in comparison with values of received field strength using an antenna held several wavelengths away from the body.

6. Dependence of Field Strength on Time, Location and Nature of Terrain

CCIR Recommendation 370 and CCIR Report 239 consider problems of the dependence of field strength on time location and the nature of the terrain.

The parameter $\Delta h$ is used to define the degree of terrain irregularity (see CCIR Recommendation 310) and in this case, it is determined for the range 10 km to 50 km from the transmitter. Its derivation and use in correcting median field-strength values for areas where the terrain is smoother or rougher than average is described in CCIR Report 239. The range of variation of the log-normal location distribution, i.e., the standard deviation, $\sigma_L$, increases with increasing values of $\Delta h$ and frequency.

For many practical purposes, for instance the evaluation of the probability of interference when preparing frequency plans for mobile radio, the following approximations have been shown to be useful and sufficiently accurate:

the time and location distributions of field strength are assumed to be log-normal (Gaussian (dB)) in the range of interest (between about 5% and 50% for the time distribution);

the standard deviations of the location-and time-distributions ($\sigma_L$ and $\sigma_1$) are derived from CCIR Recommendation 370, assuming a Gaussian time distribution for time percentages between 5% and 50% (see Table II);

the combined standard deviation is given by $\sigma = \sigma_L^2 + \sigma_{12}$.

TABLE II

| Band | | Standard deviations $\sigma_L$ and $\sigma_1$ | | | | | | |
|---|---|---|---|---|---|---|---|---|
| | | $\sigma_L$(dB) | | | | $\sigma_1$(dB) | | |
| VHF | | 8 | | | d(km) 50 | 100 | 150 | 175 |
| | | | | | Land and Sea 3 | 7 | 9 | 11 |
| UHF | $\Delta h$(m) | 50 | 150 | 300 | Land 2 | 5 | 7 | |
| | | 10 | 15 | 18 | Sea 9 | 14 | 20 | |

Note — The values in Table II refer to rural areas. They should be applied with caution when used with FIGS. 1 and 2, which are for urban areas.

A recent analysis of a large amount of measurement data in the United States led to the derivation of the following expression relating location variability (standard deviation), $\sigma_L$, to the transmission wavelength, $\lambda$, and terrain irregularity, $\Delta h$, for $\Delta h/\lambda \leq 3000$:

$$\sigma_L = 6 + 0.69(\Delta h/\lambda)^{\frac{1}{2}} - 0.0063(\Delta h/\lambda) \text{dB} \quad (8)$$

For $(\Delta h/\lambda) > 3000, \sigma_L = 25$dB.

The coefficients in equation (8) differ from those in the original equation in [Longley, 1976], where $\Delta h$ is defined as a function of distance rather than for a fixed range of 10 to 50 km.

The data used in this study were spot measurements obtained over paths ranging from 0.5 to 120 km in length, with antenna heights from 0.6 to 15 m, over terrain ranging from plains to rugged mountains and at frequencies from 30 MHz to 10 GHz.

In interference calculations it is sometimes desirable to take into consideration the correlation between signals received at the mobile station from non co-sited transmitters. A study of data at 913 MHz in suburban to urban surroundings in the United States of America found some positive correlation between signals received at a mobile station from base station sites separated by as much as 55° in azimuth. Correlation between signals transmitted over paths with a common transmitting or receiving terminal is also discussed in CCIR Report 228, based on measurements at VHF.

6.1 Local Variations in Field Strength

Local variations over distances of several meters, due to multipath propagation, will often be significant in built-up areas and near trees. The variations will also depend on polarization. For example, 3 or 4-story buildings might cause an average diffraction or screening loss of 10-12 dB at VHF for an antenna a few meters above ground in the adjacent street; however, the local variations in that street would be of the order of 5 dB (peak-to-peak) with horizontal polarization and 10-11 dB with vertical polarization. Local variations at VHF in a tree-lined road (with the trees the only substantial obstacles) are likely to be of the order of 4-5 dB with horizontal polarization and 10-12 dB with vertical polarization. In hilly country, the minimum field strength tends to occur on the near-side slope of a valley rather than at its deepest point, and this minimum tends to be lower with horizontal polarization than with vertical. On the side of the hill facing the transmitter, horizontally polarized signals are some 3-6 dB higher than for vertical polarization at frequencies around 100 MHz.

This concludes the CCIR Report 567-3.

The system in accordance with the present invention is particularly suited for mobile radio systems in which a multiplicity of mobile stations 10 operate simultaneously in an operating area, for in that case the respective calculated transmission losses may be interchanged between the mobile stations 10 themselves and between the mobile stations and the fixed stations 14 often provided in such systems. When a calling station 10 finds during setting up of a radio link that a direct link between it and a remote station 14 with its antenna 15 (either mobile or stationary) is too poor, for example, but that there is good communication with a neighboring station which in turn has good communication with the desired remote station, the link can be set up in known manner through the neighboring station, which then acts as a relay station.

In accordance with a further improvement of the invention, it has been found appropriate when, after a radio link has been established, the actually occurring characteristic radio parameters such as transmitter level, receiver level, phase jitter, S/N ratio, transmission loss etc. are measured during the subsequent radio operation between the calling station 10 and the remote station 14, and are also stored in the electronic memory 12 via a processor 11 and input/output device 18 for the respective location of the mobile station, so that eventually a data bank will be established in the memory 12 of every mobile station 10 which, in addition to the geographical and topographical data of the operating area for various locations, respectively represents the quality of the radio link with selected remote stations. When a radio link is to be established, the mobile calling station 10, after inputting its current position through an input/output device 18, may immediately call up the optimum conditions for a LOS radio link with a selected remote station, so that even a calculation on the basis of the geographical data may become unnecessary.

The system according to the present invention allows optimum operation of a mobile radio system, since, by direct change of the transmitting/receiving parameters and possibly also the type of modulation of the transmitted signals, quite specific radio link conditions in the operating area can be achieved. Thus, it may be possible to choose the parameters on the basis of the calculated data in such a way that direct communication between a mobile station 10 and a remote station 74 exhibits optimum performance, while the antenna height of station 74 does not, however, exceed a predetermined height and the receiving level in station 70 is above a predetermined threshold, so that interception of the link between station 10 and station 74 is no longer possible at a given distance.

Moreover, the system according to the present invention allows the controlled setting-up of active and/or passive reflectors 19 at precisely defined, and in most cases exposed, geographical locations in the operating area to improve the radio link. Such additional reflectors will either passively reflect the incident signals from the calling station or will amplify the signals and re-transmit them in a given direction after power amplification (frequency converter). Thus, the signals may also be transmitted to an area which cannot be reached by direct LOS communication. Such passive reflectors, for example, may be aluminum strips (chaff) which are dispensed from the air over a certain area so that an area is made available which previously was in the radio shadow of a calling station. Such passive reflector layers may also be obtained by ionization of certain air layers by chemical reactions in the atmosphere, or by high-energy light stimulation (laser irradiation).

Although I have described my invention by reference to particular illustrative embodiments thereof, many changes and modifications of the invention may become apparent to those skilled in the art without departing from the spirit and scope thereof. I therefore intend to include within the patent warranted hereon all such changes and modifications as may reasonably and properly be included within the scope of my contribution to the art.

I claim as my invention:

1. A method for setting up an LOS radio link between at least one mobile calling transmitting/receiving station and at least one remote transmitting/receiving station, both located in a predetermined operating area, comprising the steps of:

providing the mobile station with an electronic memory and an associated processor;

storing at least geographical or topographical data of the operating area in the memory at the mobile station;

prior to establishing the radio link, based on a current location of the mobile calling station and location of the remote station, calculating a transmission loss between the calling station and the remote station based on at least the geographical or topographical data stored in the memory at the mobile station by inputting into the processor at least the current location of the mobile calling station; and adjusting operation characteristics of the mobile station in accordance with the calculated transmission loss.

* * * * *